United States Patent [19]
Otsuka et al.

[11] Patent Number: 5,606,547
[45] Date of Patent: *Feb. 25, 1997

[54] OPTICAL DISC CARTRIDGE AND MECHANISM FOR PREVENTING AN INCORRECT INSERTION OF A CARTRIDGE

[75] Inventors: Yasuo Otsuka, Kamakura; Nobuhiro Katase; Tohru Sasaki, both of Yokohama, all of Japan

[73] Assignee: Hitachi, Ltd., Tokyo, Japan

[*] Notice: The term of this patent shall not extend beyond the expiration date of Pat. No. 5,297,133.

[21] Appl. No.: 173,053

[22] Filed: Dec. 27, 1993

Related U.S. Application Data

[63] Continuation of Ser. No. 224,728, Jul. 27, 1988, Pat. No. 5,297,133.

[30] Foreign Application Priority Data

| Jul. 27, 1987 | [JP] | Japan | 62-185471 |
| Nov. 9, 1987 | [JP] | Japan | 62-280919 |

[51] Int. Cl.⁶ .................................. G11B 23/03
[52] U.S. Cl. .......................... 369/291; 360/133
[58] Field of Search .................. 369/291, 77.2; 360/99.06, 106, 133; 206/309, 312

[56] References Cited

U.S. PATENT DOCUMENTS

| Re. 32,876 | 2/1989 | Wakabayashi et al. | 360/133 |
| 4,546,397 | 10/1985 | Asami et al. | 360/99 |
| 4,685,017 | 8/1987 | Swinburne | 360/133 |
| 4,688,206 | 8/1987 | Nakagawa et al. | 369/291 |
| 4,698,714 | 10/1987 | Sugawata et al. | 360/133 |
| 4,710,831 | 12/1987 | Nishimura | 360/99.02 |
| 4,837,758 | 6/1989 | Motoyama et al. | 369/13 |
| 4,849,844 | 7/1989 | Kato | 360/133 |
| 4,858,050 | 8/1989 | Ashe et al. | 369/291 X |
| 5,081,557 | 1/1992 | Takeuchi et al. | 369/291 |
| 5,297,133 | 3/1994 | Otsuka et al. | 369/291 |

FOREIGN PATENT DOCUMENTS

| 97221 | 4/1984 | European Pat. Off. . | |
| 0144974 | 6/1985 | European Pat. Off. | 360/133 A |
| 204921 | 12/1986 | European Pat. Off. . | |
| 219980 | 4/1987 | European Pat. Off. . | |
| 248908 | 12/1987 | European Pat. Off. . | |
| 3414587 | 10/1984 | Germany | 360/133 A |
| 50-15528 | 2/1975 | Japan . | |
| 53-161613 | 12/1978 | Japan . | |
| 54-39020 | 3/1979 | Japan . | |
| 58-70463 | 4/1983 | Japan . | |
| 58-102370 | 6/1983 | Japan . | |
| 58-97166 | 6/1983 | Japan . | |
| 58-1409570 | 9/1983 | Japan . | |
| 58-169379 | 10/1983 | Japan . | |
| 58-171771 | 10/1983 | Japan . | |
| 59-2269 | 1/1984 | Japan . | |
| 59-164981 | 11/1984 | Japan . | |

(List continued on next page.)

OTHER PUBLICATIONS

Fifth Draft of an American National Standard (Aug. 1984).
American National Standard (ANSI X3.137–1988).
JIS 90mm Flexible Disk Cartridge (Jan. 1987).

*Primary Examiner*—Stuart S. Levy
*Assistant Examiner*—Kevin M. Watkins
*Attorney, Agent, or Firm*—Antonelli, Terry, Stout & Kraus, LLP

[57] ABSTRACT

An optical disc cartridge provided with a mechanism for preventing incorrect insertion of a cartridge. A cut-off portion is provided at a head and side portion at an inserting side of, for example, a 3.5" erasable optical disc cartridge. The cut-off portion is located at an side opposite to a corresponding cut-off portion used in a 3.5" (86 mm) floppy disc cartridge. A stopper is provided in a cartridge insertion portion of the reproducing apparatus to prevent incorrect insertion of the cartridge and is located to correspond to the location of the cartridge cut-off portion. A depression or the like is provided at a front end of the cartridge and at a portion symmetrical about an axis to an edge of the shutter where the shutter opening lever normally strikes.

87 Claims, 5 Drawing Sheets

FOREIGN PATENT DOCUMENTS

| | | |
|---|---|---|
| 60-6946 | 3/1985 | Japan . |
| 61-126428 | 8/1986 | Japan . |
| 61-246957 | 11/1986 | Japan ................................ 360/99.06 |
| 62-252 | 1/1987 | Japan . |
| 62-254 | 1/1987 | Japan . |
| 0033381 | 2/1987 | Japan ................................ 360/133 A |
| 62-110683 | 5/1987 | Japan . |
| 62-154390 | 7/1987 | Japan . |
| 62-175465 | 11/1987 | Japan . |
| 62-180379 | 11/1987 | Japan . |
| 1-124174 | 5/1989 | Japan . |
| 2082371 | 3/1982 | United Kingdom . |

OPTICAL DISC CARTRIDGE AND MECHANISM FOR PREVENTING AN INCORRECT INSERTION OF A CARTRIDGE

This is a continuation of application Ser. No. 07/224,728, filed Jul. 27, 1988, now U.S. Pat. No. 5,297,133.

BACKGROUND OF THE INVENTION

The present invention relates to an optical disc cartridge construction having a mechanism for preventing incorrect insertion of the cartridge and, more particularly, to a 3.5" optical disc cartridge with such a mechanism.

There are currently three kinds of "write-once" type of optical discs on the market, namely 12", 8", 5.25". More recently, a 3.5" erasable optical disc has been under development. For designing a ⅜" erasable optical disc cartridge, a standard 3.5" magnetic floppy disc cartridge based on the U.S. "ANSI X 3B8/86-57" proposal has been helpful. The structure of a 3.5" magnetic floppy disc is shown in U.S. Pat. No. 4,546,397. The diameter of a 3.5" magnetic floppy disc is 86 mm, the width of the cartridge is 90 mm, the length of the cartridge is 94 mm, and the cartridge thickness is 3.3 mm. The diameter of a 3.5" erasable optical disc is 86 mm, the cartridge width is 90 mm, the cartridge length is 94 mm and the cartridge thickness is 6 mm or 8 mm.

In a reproducing apparatus for a 3.5" floppy disc, accidental insertion of the 3.5" erasable optical disc cartridge can be prevented because the aperture opening of the reproducing apparatus for inserting the floppy disc cartridge is smaller than the thickness of the 3.5" erasable optical disc cartridge. However, in a reproducing apparatus for a 3.5" erasable optical disc, a 3.5" floppy disc which is thinner than its optical disc counterpart can accidentally be inserted into an aperture of the reproducing apparatus for the optical disc cartridge. In such a case, the optical head for retrieving data in the reproducing apparatus or a disc rotating portion can be damaged.

SUMMARY OF THE INVENTION

An object of the present invention is to provide a 3.5" erasable optical disc cartridge which has a mechanism for preventing an incorrect insertion of a different kind of cartridge in an incompatible reproducing apparatus.

A further object of the present invention is to provide a cartridge for preventing erroneous upside down insertion of a cartridge which has an antisymmetrical shutter location.

In accordance with the present invention, a cut-off portion is provided at a head and side portion at an inserting side of the 3.5" erasable optical disc cartridge. The cut-off portion is located at an opposite side to a corresponding cut-off portion used in the 3.5" floppy disc cartridge.

Furthermore, in the present invention, a stopper is provided in a cartridge insertion portion of the reproducing apparatus as a mechanism to prevent incorrect insertion of the cartridge. The stopper corresponds to the location of the cut-off portion of the cartridge. In case of the incorrect insertion of the cartridge, the stopper prevents further cartridge movement.

Additionally, in accordance with the present invention, two kinds of levers can be provided. The first lever is used for opening the shutter at the time of cartridge insertion. The second lever is used for contacting the optical disc with a motor rotating portion. A second stopper can also be provided in the present invention for stopping the cartridge through contact with the first lever. The second stopper is located at the position where the second lever cannot touch the cartridge if the shutter is still closed.

In accordance with the aforementioned structure, the cartridge, when correctly placed in the reproducing apparatus, just misses touching the stopper, which otherwise prevents incorrect insertion of the optical disc cartridge, because of the existence of the cut-off portion on the cartridge. In case of a mistaken insertion of a 3.5" magnetic floppy disc cartridge which is a different cartridge incompatible with an optical disc reproducing apparatus, the stopper in the reproducing apparatus contacts a non-cut-off portion of the 3.5" magnetic floppy disc cartridge, thereby preventing incorrect insertion of the floppy disc cartridge.

If the first lever misses contact with the shutter, the first lever will slide on the front edge of the shutter and forward into the reproducing apparatus at a slightly advanced condition compared with its normal position, so that the cartridge will hit the second stopper through the first lever and stops further movement of the second lever. By stopping the movement of the second lever, damage to an information-retrieving optical head in the reproducing apparatus or to a disc rotating portion is prevented.

Still further, a stopper, such as a depression, is provided at a front end of the cartridge and at a portion symmetrically about an axis to an edge of the shutter where the shutter opening lever normally hits when the cartridge is properly inserted in the reproducing apparatus. When the cartridge is improperly inserted, the shutter opening lever is stopped by the depression provided at the front end of the cartridge. The rotating movement of the lever is stopped, and the insertion of the cartridge is also stopped because the lever operates as a barrier.

BRIEF DESCRIPTION OF THE DRAWINGS

These and other features, objects and advantages of the present invention will become more apparent from the following description when taken in conjunction with the accompanying drawings wherein:

FIGS. 11A, 11B, 11C illustrate a further embodiment of the present invention wherein FIG. 11A is an elevation view, FIG. 11B is a front plane view of the cartridge of FIG. 11A, and FIG. 11C is a cross sectional view taken along line E—E in FIG. 11B.

DETAILED DESCRIPTION OF PRESENTLY PREFERRED EMBODIMENTS

Figure 1:
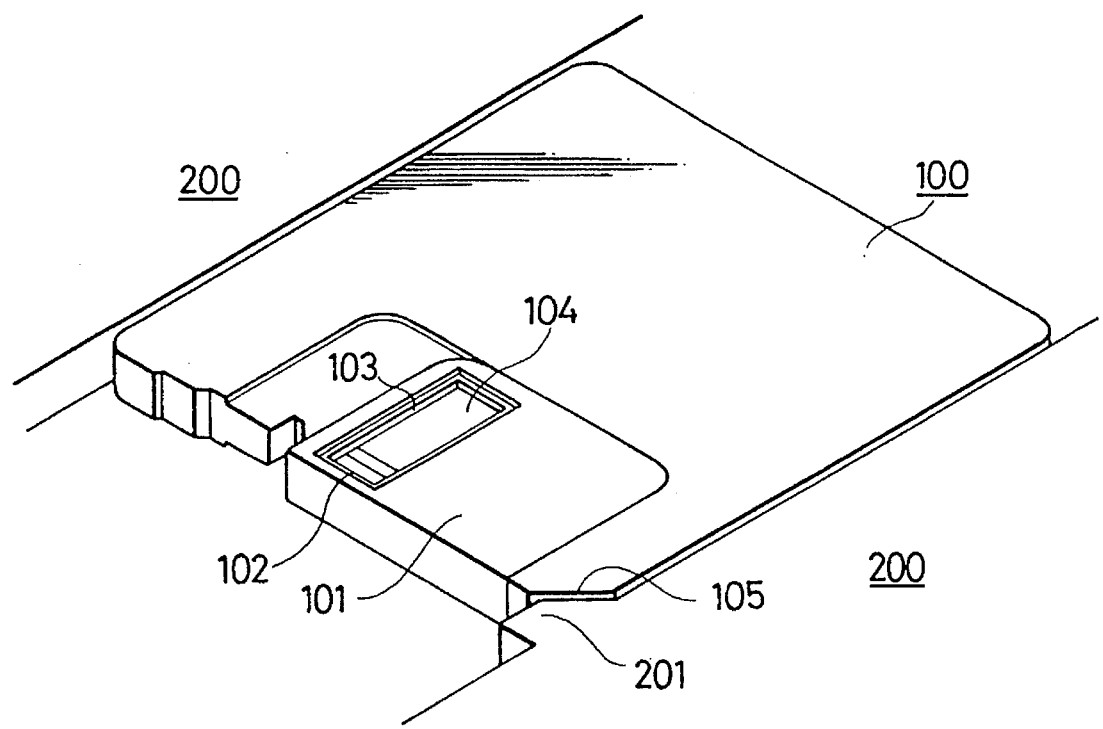
FIG. 1 is a perspective view showing a top side of an optical disk cartridge embodiment of the present invention.
Figure 2:
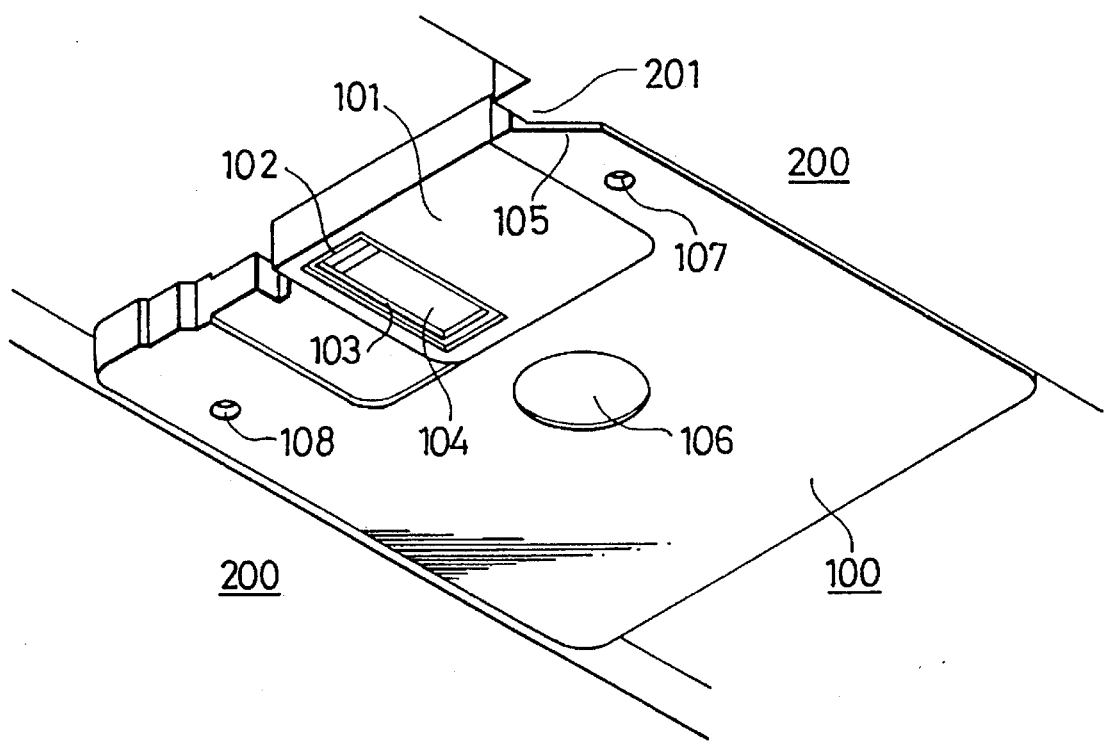
FIG. 2 is a perspective view of the opposite side of the cartridge shown in FIG. 1.

In FIGS. 1 and 2, the reference numeral 100 designates an optical disc cartridge case which receives and protects an optical disc 104 inside. A cartridge inserting portion 200 is provided in an information reproducing apparatus which, for purposes of clarity, is not shown in detail. A shutter 101 slides open at the time the cartridge 100 is inserted into the information reproducing apparatus. An aperture 102 is provided on the shutter 101, and an aperture 103 is provided on the cartridge 100. An aperture 106 is centrally located on the cartridge case 100 for inserting a conventional motor rotating portion (not shown) for rotating the optical disc 104. Location holes 107,108 are provided for prescribing dimensions of parts of the cartridge 100 for standardization purposes. The location holes 107 and 108 are also used to accurately align the cartridge 100 in the cartridge inserting portion 200. A cut-off portion 105 is provided at one side of the inserting end or head of the cartridge 100 and at the opposite side of the 3.5" magnetic floppy disc cartridge standard based on the U.S. "ANSI X 3B8/86-57" proposal. A stopper 201 for preventing the incorrect insertion of a cartridge other than an optical disc cartridge with a correctly located cut-off portion 105 is provided in the cartridge inserting portion 200 to cooperate with the cut-off portion 105.

The optical disc 104 in the present invention includes an optical disc of a reproducing-only type comprising uneven pits, an optical disc of a write-once type using a hole-melting, a phase change, and an organic dye, and an optical disc of the erasable type using a magnetic-opto, and a phase change.

Figure 3:
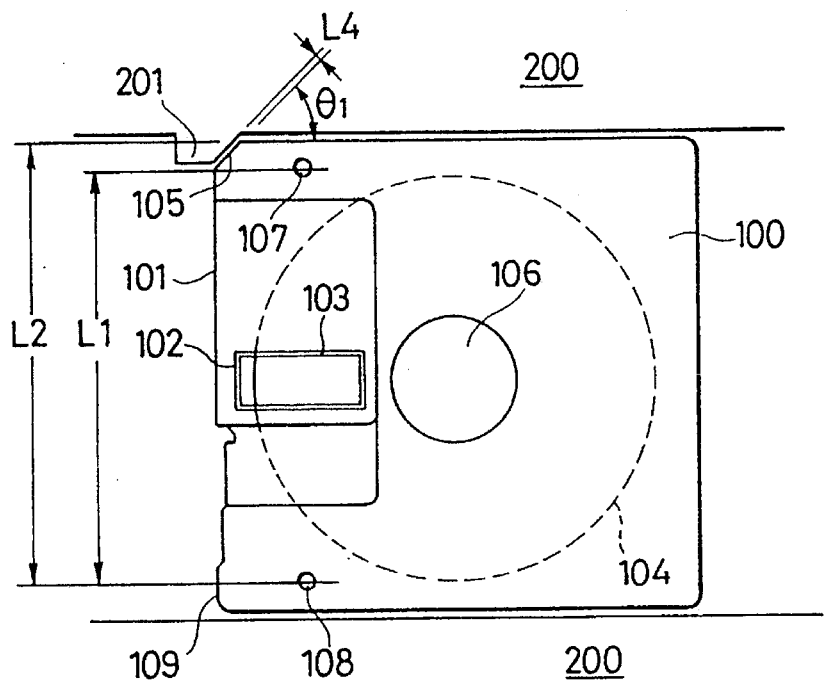
FIG. 3 is a bottom view of the cartridge shown in FIG. 1.

As shown in FIG. 3, the cut-off portion 105 is located at the opposite side of a corresponding cut-off portion used in a 3.5" magnetic floppy disc cartridge. In other words, there is no cut-off portion at the opposite side portion 109 where in a 3.5" magnetic floppy disc there is normally provided a cut-off portion. Furthermore, the stopper 201 is provided in the cartridge inserting portion 200 to cooperate with the cut-off portion 105. On one hand, when the cartridge 100 having the cut-off portion 105 is inserted, the cartridge 100 can be set in the proper position without actually touching or abutting against the stopper 201. On the other hand, if the wrong type of cartridge, for example, the 3.5" magnetic floppy disc cartridge is attempted to be inserted in the reproducing apparatus, a side edge portion of the wrong cartridge hits against the stopper 201 before the cartridge is fully received in the aperture, and the cartridge cannot be inserted further into the information reproducing apparatus. Since the incorrect insertion of the wrong cartridge can be prevented, damage to an optical head for retrieving data in the reproducing apparatus or to a disc rotating portion can be prevented.

If the following dimensions to the reference hole 108 are selected as the location of the cut-off portion 105 in the cartridge of the present invention, the profiles of the optical disc cartridge of the present and of the standard magnetic floppy disc are almost the same, thereby simplifying the design and production of the cartridge inserting portion.

L1=80 mm

L2=85 mm

θ1=45 deg

The distance between the cut-off portion 105 and the stopper 201 is not less than about 0.5 mm at the narrowest portion.

The above described dimensions are merely exemplary. Other dimensions can also be Used without departing from a concept of the present invention, i.e. as long as the cut-off portion 105 is provided at the side opposite to the cut-off portion on the 3.5" magnetic floppy disc so that the incorrect insertion of a 3.5" magnetic floppy disc into the information reproducing apparatus can be prevented.

Figure 4:
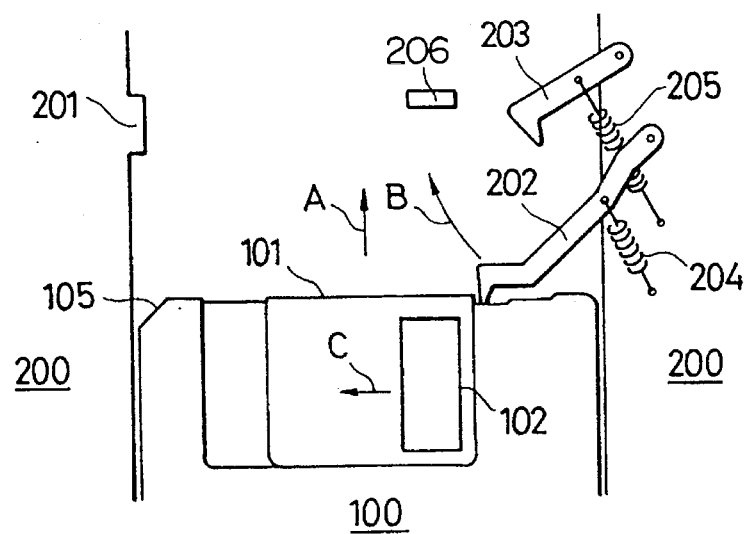
FIGS. 4 and 5 are plan views of another embodiment of the present invention.
Figure 5:
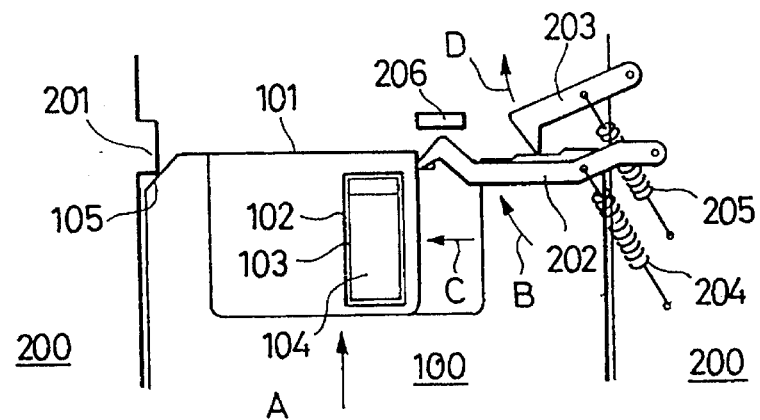

In FIGS. 4 and 5, a first lever 202 is provided for opening the shutter at the time of insertion of the cartridge 100. A second lever 203 operates the motor rotating portion. The first lever 202 and the second lever 203 are biased toward their normal position by springs 204 and 205. A stopper 206 prevents the operation of the second lever 203 when the cartridge 100 is inserted into the reproducing apparatus and the shutter 101 is closed.

FIGS. 4 and 5 demonstrate the situation when the cartridge 100 is inserted into the reproducing apparatus correctly. After inserting the cartridge 100 along the cartridge inserting portion 200 in a direction indicated by an arrow A, the first lever 202 contacts a side edge of the shutter 101, rotates in a direction indicated by an arrow B, and slides the shutter 101 in a direction indicated by an arrow C in response to the insertion of the cartridge 100. Further insertion of the cartridge 100 causes the edge of the cartridge 100 to touch the second lever 203, and pushes lever 203 to operate a motor rotating portion through electrical circuitry in a conventional manner. A center area of the optical disc 104 is called a hub, and is made of metal for magnetic clamping. The motor rotating portion comprises a motor and a magnetic turntable. The turntable couples with the hub by magnetic force through an aperture 106 of the cartridge, and transmits rotating power of the motor to the optical disc 104. In this state, the aperture 102 of the shutter 101 coincides with the aperture 103 of the cartridge 100, and the information reproducing apparatus is in an operative mode.

If the first lever 202 does not catch the edge of the shutter 101, the first lever 202 rotates in the direction of arrow B and moves along the front edge of the shutter 101. In this abnormal condition, the first lever 202 will move into the reproducing apparatus in advance of its normal position when it slides the shutter in the direction of arrow C as shown in FIGS. 4 and 5. As a result, the first lever 202 riding on the cartridge 100 hits the second stopper 206. By stopping the movement of the second lever 203, damage to an information-retrieving optical head in the reproducing apparatus or to a disc rotating portion is prevented.

Figure 6:
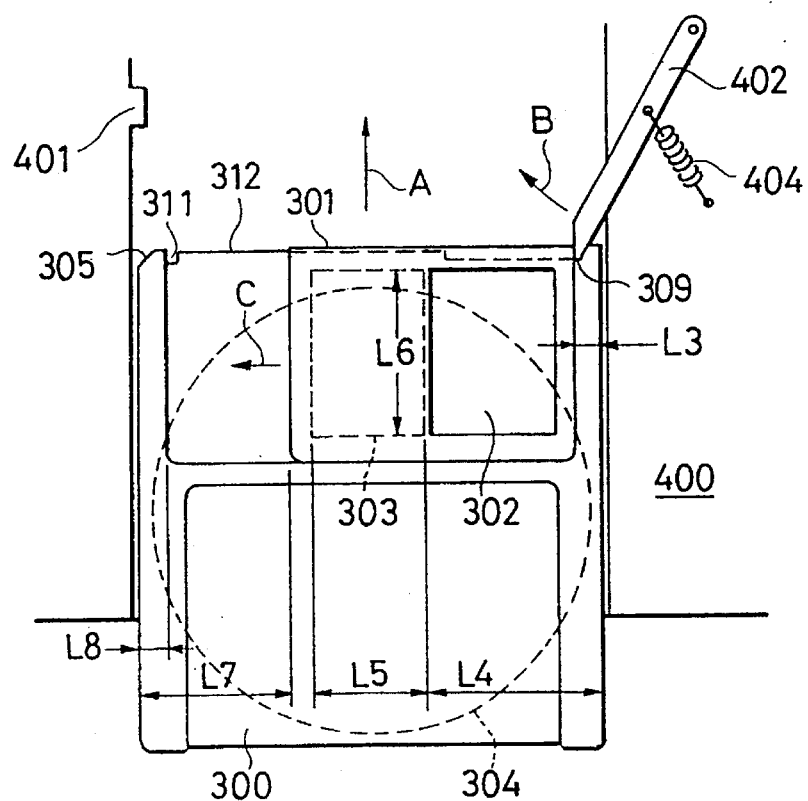
FIGS. 6 and 7 are explanatory plan views of still another embodiment of the present invention.
Figure 7:
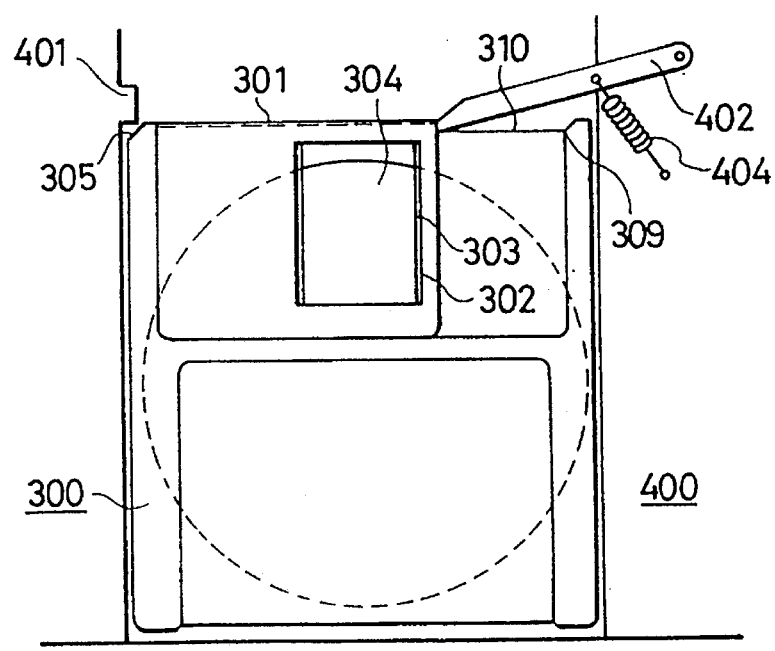

In FIGS. 6 and 7, there is shown another embodiment of an optical disc cartridge 300. An optical disc 304 is operatively held in the optical disc cartridge 300. A shutter 301, a front edge of which has an asymmetrical shape in a direction of insertion shown by arrow A. An aperture 302 is provided on the shutter 301, and a corresponding aperture 303 is provided at the cartridge 300 which is configured to be inserted into an information reproducing apparatus 400. A lever 402 opens the shutter 301 and is biased toward the nonoperating condition by a spring 404. A stopper 401 is provided to cooperate with a cut-off portion 305.

Certain dimensions of the cartridge 300 are as follows:

L0 = 90 mm,    L3 = 5 mm,    L4 = 34 mm,    L5 = 22 mm
L6 = 32 mm,    L7 = 30 mm,    L8 = 5 mm

FIGS. 6 and 7 demonstrate a situation where the cartridge 300 is inserted into the reproducing apparatus 400 in the correct way. After inserting the cartridge 300 along the cartridge inserting portion 400 in a direction indicated by the arrow A, the lever 402 strikes a front edge 309 of the cartridge 300 and a side edge of the shutter 301, and rotates in a direction indicated by an arrow B. The head of the lever 402 slides along the front edge 310 of the cartridge 300 and then slides the shutter 301 in a direction indicated by an arrow C in response to the insertion of the cartridge 300 in the reproducing apparatus. At this stage, the aperture 302 of the shutter 301 coincides with the aperture 303 of the cartridge 300, and the information reproducing apparatus is in an operative condition.

Figure 8:
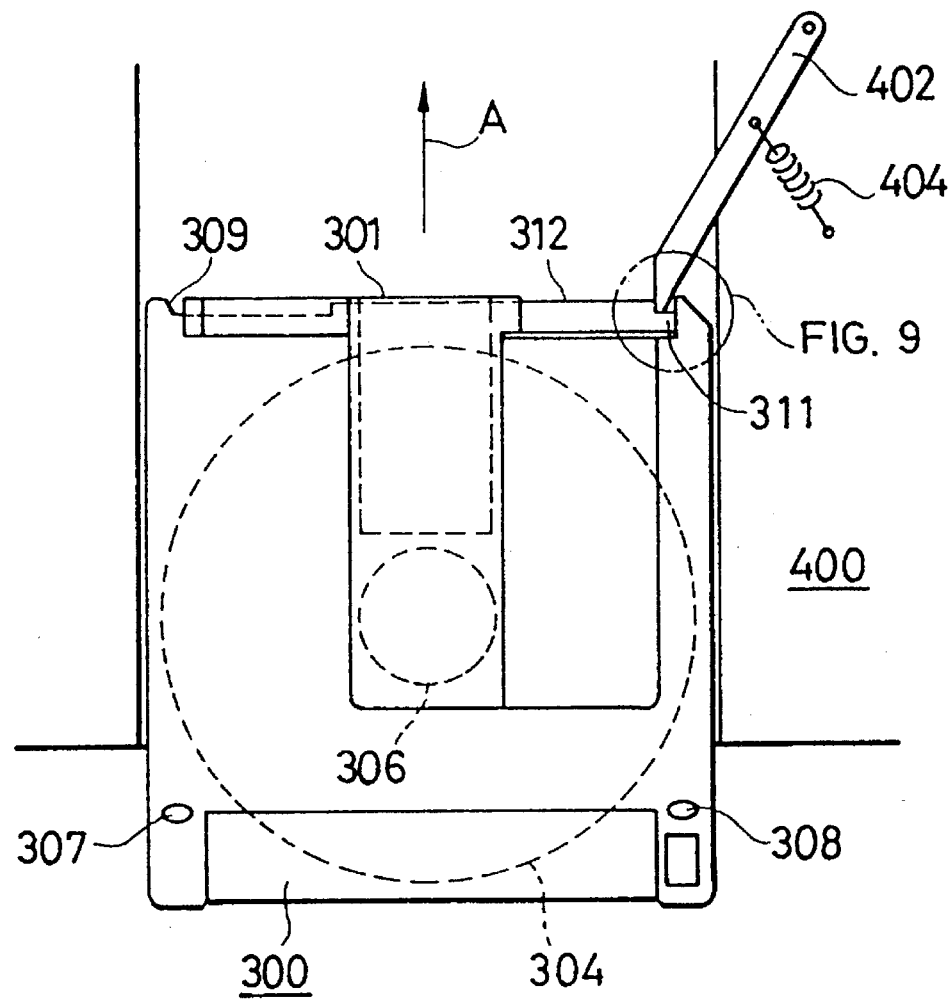
FIG. 8 shows a cartridge in accordance with the present invention to explain the principles thereof.

FIG. 8 shows the instance when the cartridge 300 of FIGS. 6 and 7 is erroneously inserted upside down into the reproducing apparatus 400. The bottom side of the cartridge 300 is shown in FIG. 8 in contrast to FIGS. 6 and 7 where the top side is shown. A depression 311 serves as a stopper. The distance between the side edge of the shutter 301 and the right side of the cartridge 300 is indicated as L3 in FIG. 6. The distance from the beginning of the depression 311 to the left side of the cartridge 300 is indicated as L8 in FIG. 6. In this example, the distances L3 and L8 are 5 mm. Thus, the location of the side edge of the shutter 301 from the right side of the cartridge 300 in FIG. 6 and the location of the beginning of the depression 311 from the left side of the cartridge 300 in FIG. 8 are also the same.

When the cartridge 300 is inserted into the reproducing apparatus incorrectly as shown in FIG. 8, the edge of the lever 402 is caught by the depression 311, and the movement of the lever 402 is stopped. Therefore, the insertion of the cartridge is prevented.

If a depression is not provided in front of the cartridge 300 and the cartridge 300 is inserted with the wrong side up into the reproducing apparatus, the top edge of the lever 402 is not caught by any structure, and, as a result, the lever 402 can slide on the front edge 312 until the top edge of the lever 402 hits the right edge of the shutter 301. When the lever 402 hits the shutter 301, almost all of the cartridge has been inserted into the reproducing apparatus. If the user tries to push the remaining few millimeters of the cartridge into the reproducing apparatus by force, the shutter 301 or the lever 402 or both can break. The user may not be able to pull the cartridge 300 out from the reproducing apparatus if the cartridge has been forced.

In FIG. 8, an aperture 306 is provided for inserting a motor rotating portion (not shown) to rotate the optical disc 304. The aperture 306 is covered by the shutter 301 for preventing dust pollution. Location holes 307,308 prescribe dimensions of parts of the cartridge 300. The location holes 307 and 308 are also used accurately to align the cartridge 300 in the cartridge inserting portion 400.

Figure 9:
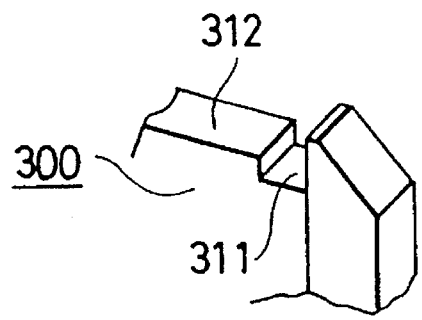
FIG. 9 is an enlarged perspective view of a depression shown in FIG. 8.

FIG. 9 shows on an enlarged scale in perspective the depression 311 shown in FIG. 8.

Figure 10A:
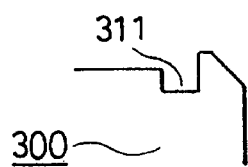
FIGS. 10A, 10B, 10C, 10D, 10E, 10F illustrate various embodiments of the depression shown in FIGS. 8 and 9.
Figure 10D:
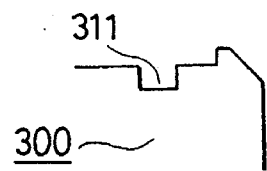
Figure 10B:
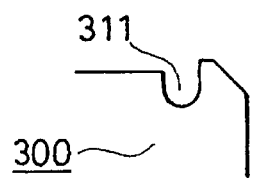
Figure 10E:
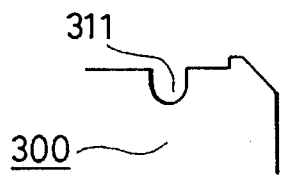
Figure 10C:
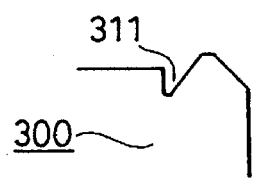
Figure 10F:
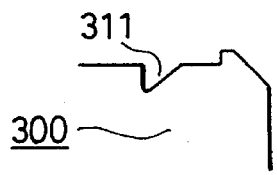

FIGS. 10A–10F show various embodiments of the depression shown in FIGS. 8 and 9. We have found different shapes and locations to be suitable. In FIGS. 10D, 10E and 10F, the depression 311 is located slightly leftwardly of the side of the cartridge 300 compared with the depressions shown in FIGS. 10A, 10B and 10C.

Figure 11A:
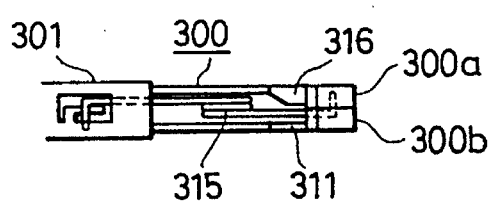
Figure 11B:
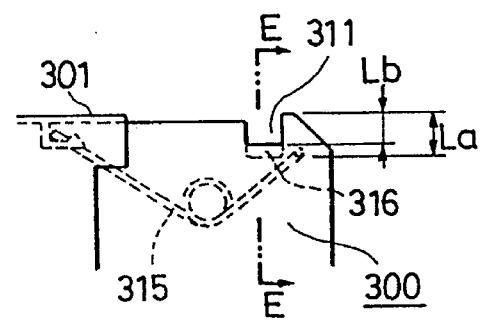
Figure 11C:
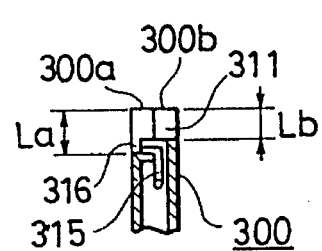

Normally, as the cartridge 300 is being taken out from the reproducing apparatus, the shutter 301 must be closed. A twisted coil spring is conventionally used for biasing the shutter to a closed position. The case of the cartridge 300 is typically constructed in two pieces. In FIGS. 11A–11C, the twisted coil spring 315 is fitted within the cartridge 300 so as to normally close the shutter 301 when he cartridge 300 is not inserted in the reproducing apparatus. The disc cartridge 300 consists of an upper case piece 300a and a lower case piece 300b. For fitting the twisted coil spring 315 in the cartridge 300 after fitting one of the ends of the coil spring 315 to the shutter 301, the other end of the coil spring 315 is put into the cartridge 300. The depression 311,316 serving as the stopper is provided on respective case pieces 300b and 300a. The depression 316 is deeper than the depression 311 in order to make it easier to fit the coil spring 315 into the cartridge 300. The coil spring 315 can be put into the cartridge 300 by pushing one end of the spring 315 against the case piece 300b, because there is a difference of depths, La and Lb, at the respective depressions 316,311 as shown in FIG. 11C.

According to the present invention, a cut-off portion is provided at head and side portion at an inserting side of a 3.5" erasable optical disc cartridge, and opposite to the location of a cut-off portion used in the 3.5" (86 mm) floppy disc cartridge. A stopper in a cartridge insertion portion of the reproducing apparatus is correspondingly located in operative relationship to the cut-off portion of the cartridge to prevent insertion of a different kind of cartridge into the reproducing apparatus or incorrect insertion of the proper cartridge.

A stopper such as a depression is provided at a front end of the cartridge at a location identical to an edge of the shutter on the other side of the cartridge where the shutter opening lever hits to prevent erroneous upside down insertion of the cartridge.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications as fall within the ambit of the appended claims.

We claim:

1. An optical disc cartridge comprising:

a case having a substantially square shape with first, second, third and fourth edge surfaces delimiting boundaries of the case, the case having an optical disc therein and having a window for exposing at least a portion of the optical disc within the case, the first edge surface of the case being delimited by a first corner portion connecting the first edge surface and the second edge surface and a second corner portion connecting the first edge and the third edge surface;

a shutter member arranged for sliding movement over the first edge surface from a first position where the window is closed by the shutter member to a second position where the window is opened by movement of the shutter member, the shutter member having a contact portion in the region of the second corner portion in the first position of the shutter member for being contacted to cause sliding movement of the shutter member toward the second position in a direction toward the first corner portion so that the contact portion in the second position of the shutter member is closer to the second corner portion than the first corner portion; and biasing means for biasing the shutter member in a direction toward the first position wherein the window is closed;

the case having a recess formed by a set back portion set back from the first edge surface of the case in a region of the first corner portion of the case, a surface portion of the set back portion of the recess extending substantially parallel to the first edge surface and below the first edge surface, the shutter member being slidable over the first edge surface and the set back portion, the set back portion delimiting an opening extending through the case.

2. An optical disc cartridge according to claim 1, wherein the set back portion of the case and the contact portion of the shutter member are substantially symmetrically arranged with respect to a center line passing through an axis of the optical disc and extending substantially perpendicular to the first edge surface of the case.

3. An optical disc cartridge according to claim 1, wherein a distance from the second edge surface to at least one part of the set back portion in an extension direction of the first edge surface is at least equal to a distance from the third edge surface to the contact portion in the first position of the shutter member in the extension direction of the first edge surface.

4. An optical disc cartridge according to claim 3, wherein the distance of the at least one part of the set back portion from the second edge surface of the case is greater than the distance from the contact portion in the first position of the shutter member to the third edge surface of the case.

5. An optical disc cartridge according to claim 1, wherein the set back portion includes a first part and a second part spaced from the first part in an extension direction of the first edge surface, the first part being closer than the second part to the second edge surface, the first part and the second part extending in a direction transverse to the first edge surface of the case.

6. An optical disc cartridge according to claim 5, wherein a distance from the third edge surface to the second part of the set back portion in the extension direction of the first edge surface is less than a distance from the second edge surface to the contact portion in the first position of the shutter member in the extension direction of the first edge surface.

7. An optical disc cartridge according to claim 5, wherein a distance from the second edge surface to the second part of the set back portion in the extension direction of the first edge surface is greater than a distance from the third edge surface to the contact portion in the first position of the shutter member in the extension direction of the first edge surface.

8. An optical disc cartridge according to claim 1, wherein the shutter member slides in a straight path over the first edge surface.

9. An optical disc cartridge according to claim 1, wherein the set back portion is exposed at the first edge surface in the first position of the shutter member wherein the window is closed.

10. An optical disc cartridge according to claim 1, wherein the case further includes a chamfer portion extending between the first and second edge surfaces of the case.

11. An optical disc cartridge according to claim 10, wherein the case has the chamfer portion in the region of the first corner portion of the case, and wherein the window of the optical disc cartridge is an aperture, the optical disc cartridge having a width equal to the width of a 3.5" flexible disk cartridge prescribed in the ANSI standard for a magnetic disc which is a disc cartridge incompatible with the optical disc cartridge, and a thickness greater than the thickness of the 3.5" flexible disk cartridge prescribed in the ANSI standard, the optical disc cartridge having the first edge surface as a front edge surface of the optical disc cartridge and the second edge surface orthogonal to the first edge surface, the second edge surface being a first side edge surface of the optical disc cartridge, the first edge surface and the second edge surface intersecting in the region of the first corner portion of the optical disc cartridge, wherein the 3.5" flexible disk cartridge as prescribed in the ANSI standard has a first edge surface as a front edge surface over which a shutter member slides to open or close an aperture provided to expose the flexible disk in the 3.5" flexible disk cartridge and a second edge surface as a side edge surface orthogonal to the first edge surface, the 3.5" flexible disk cartridge having a chamfer portion provided at the intersection of the first edge surface and the second edge surface of the 3.5" flexible disk cartridge in a direction that the shutter member at the front edge surface thereof moves to close the aperture when a bottom side of the 3.5" flexible disk cartridge has a location hole for prescribing dimensions of parts of the 3.5" flexible disk cartridge, the optical disc cartridge being provided with the chamfer portion in the direction in which the shutter member thereof moves to open the aperture of the optical disc cartridge, and when viewing the optical disc cartridge from the same side as viewing the 3.5" flexible disk cartridge, the chamfer portion of the optical disc cartridge is provided at a side of the optical disc cartridge which is opposite to a side of the 3.5" flexible disk cartridge where the chamfer portion of the 3.5" flexible disk cartridge is provided.

12. An optical disc cartridge according to claim 10, wherein the case has a top side and a bottom side delimited by the first, second, third and fourth edge surfaces, the bottom side has a location hole for prescribing dimensions of parts of the optical disc cartridge so that when viewing the top side from the fourth edge surface toward the first edge surface, the second edge surface is on a left side and the third edge surface is on a right side, the chamfer portion being provided in the region of the first corner portion at the left side of the case which is an opposite side with respect to the ANSI standard for a 3.5" flexible disk cartridge.

13. An optical disc cartridge according to claim 10, wherein at least one of the set back portion and the chamfer portion enables prevention of improper insertion of a cartridge into an apparatus.

14. An optical disc cartridge according to claim 10, wherein at least one of the set back portion and the chamfer portion enables discrimination of proper and improper insertion of a cartridge into an apparatus.

15. An optical disc cartridge according to claim 1, wherein the biasing means includes a spring biasing the shutter member and being disposed within the case in the region of the first corner portion of the case.

16. An optical disc cartridge according to claim 15, wherein the biasing means is a twisted coil spring extending from the first corner portion to a portion of the shutter member.

17. An optical disc cartridge according to claim 16, wherein the case has a side opening at a side of the first edge surface in the region of the first corner portion, the side opening extending into the region of the first corner portion in the case and extending across the set back portion.

18. An optical disc cartridge according to claim 17, wherein the case further includes a chamfer portion extending between the first and second edge surfaces of the case, the twisted coil spring having two ends, one of the two ends being associated with an associating portion, the associating portion extending from the set back portion and being disposed proximate to the chamfer portion in the case.

19. An optical disc cartridge according to claim 1, wherein the set back portion includes at least one part extending substantially perpendicularly to the first edge surface of the case.

20. An optical disc cartridge according to claim 1, wherein the case comprises a first case piece and a second case piece, the set back portion being formed by a first set back part provided on the first case piece and a second set back part provided on the second case piece, the first and second set back parts having substantially the same shape and extending through the case.

21. An optical disc cartridge according to claim 1, wherein the case has a side opening at a side of the first edge surface in the region of the first corner portion, the side opening extending into the region of the first corner portion in the case and extending across the set back portion.

22. An optical disc cartridge according to claim 1, wherein the set back portion is formed as part of the case separate from the shutter member.

23. An optical disc cartridge according to claim 1, wherein the set back portion includes a first part and a second part spaced from the first part in an extension direction of the first edge surface, the first part being closer than the second part to the second edge surface, the first part and the second part extending in a direction transverse to the first edge surface of the case.

24. An optical disc cartridge according to claim 23, wherein a distance from the third edge surface to the second part of the set back portion in the extension direction of the first edge surface is less than a distance from the second edge surface to the contact portion in the first position of the shutter member in the extension direction of the first edge surface.

25. An optical disc cartridge according to claim 24, wherein a distance from the second edge surface to the second part of the set back portion in the extension direction of the first edge surface is greater than a distance from the third edge surface to the contact portion in the first position of the shutter member in the extension direction of the first edge surface.

26. An optical disc cartridge according to claim 1, wherein at least the set back portion enables prevention of upside-down insertion of the cartridge into an apparatus.

27. An optical disc cartridge according to claim 26, wherein the set back portion enables capturing and blocking of a shutter opening member of the apparatus to prevent upside-down insertion of the cartridge into the apparatus.

28. A disc cartridge comprising:

a case having a substantially square shape with first, second, third and fourth edge surfaces delimiting boundaries of the case, the case having a disc therein and having a window for exposing at least a portion of the disc within the case, the first edge surface of the case being delimited by a first corner portion connecting the first edge surface and the second edge surface and a second corner portion connecting the first edge surface and the third edge surface;

a shutter member arranged for sliding movement over the first edge surface from a first position where the window is closed by the shutter member to a second position where the window is opened by movement of the shutter member, the shutter member having a contact portion in the region of the second corner portion in the first position of the shutter member for being contacted to cause sliding movement of the shutter member toward the second position in a direction toward the first corner portion so that the contact portion in the second position of the shutter member is closer to the second corner portion than the first corner portion; and biasing means for biasing the shutter member in a direction toward the first position wherein the window is closed;

the case having a recess formed by a set back portion set back from the first edge surface of the case in a region of the first corner portion of the case, a surface portion of the set back portion of the recess extending substantially parallel to the first edge surface and below the first edge surface, the shutter member being slidable over the first edge surface and the set back portion, the set back portion delimiting an opening extending through the case.

29. A disc cartridge according to claim 28, wherein the set back portion of the case and the contact portion of the shutter member are substantially symmetrically arranged with respect to a center line passing through an axis of the disc and extending substantially perpendicular to the first edge surface of the case.

30. A disc cartridge according to claim 28, wherein a distance from the second edge surface to at least one part of the set back portion in an extension direction of the first edge surface is at least equal to a distance from the third edge surface to the contact portion in the first position of the shutter member in the extension direction of the first edge surface.

31. A disc cartridge according to claim 30, wherein the distance of the at least one part of the set back portion from the second edge surface of the case is greater than the distance from the contact portion in the first position of the shutter member to the third edge surface of the case.

32. A disc cartridge according to claim 28, wherein the set back portion includes a first part and a second part spaced from the first part in an extension direction of the first edge surface, the first part being closer than the second part to the second edge surface, the first part and the second part extending in a direction transverse to the first edge surface of the case.

33. A disc cartridge according to claim 32, wherein a distance from the third edge surface to the second part of the set back portion in the extension direction of the first edge surface is less than a distance from the second edge surface to the contact portion in the first position of the shutter member in the extension direction of the first edge surface.

34. A disc cartridge according to claim 32, wherein a distance from the second edge surface to the second part of the set back portion in the extension direction of the first edge surface is greater than a distance from the third edge surface to the contact portion in the first position of the shutter member in the extension direction of the first edge surface.

35. A disc cartridge according to claim 28, wherein the shutter member slides in a straight path over the first edge surface.

36. A disc cartridge according to claim 28, wherein the set back portion is exposed at the first edge surface in the first position of the shutter member wherein the window is closed.

37. A disc cartridge according to claim 28, wherein the case further includes a chamfer portion extending between the first and second edge surfaces of the case.

38. A disc cartridge according to claim 28, wherein the biasing means includes a spring biasing the shutter member and being disposed within the case in the region of the first corner portion of the case.

39. A disc cartridge according to claim 28, wherein the set back portion includes a part extending substantially perpendicularly to the first edge surface of the case.

40. A disc cartridge comprising:

a case having a substantially square shape with first, second, third and fourth edge surfaces delimiting boundaries of the case, the case having a disc therein and having a window for exposing at least a portion of the disc within the case, the first edge surface of the case being delimited by a first corner portion connecting the first edge surface and the second edge surface and a second corner portion connecting the first edge surface and the third edge surface;

a shutter member arranged for sliding movement over the first edge surface from a first position where the window is closed by the shutter member to a second position in a direction toward the first corner portion where the window is opened by movement of the shutter member; and a spring for biasing the shutter member toward the first position wherein the window is closed, the spring being provided within the case in the region of the first corner portion;

the case having a recess formed by a set back portion set back from the first edge surface of the case in a region of the first corner portion, a surface portion of the set back portion of the recess extending substantially parallel to the first edge surface and below the first edge surface, the shutter member being slidable over the first edge surface and the set back portion, the set back portion delimiting an opening extending through the case, and the case having a chamfer portion extending between the first edge surface and the second edge surface in the region of the first corner portion.

41. A disc cartridge according to claim 40, wherein the shutter member has a contact portion in the region of the second corner portion in the first position of the shutter member for being contacted to cause sliding movement of the shutter member toward the second position in a direction toward the first corner portion so that the contact portion in the second position of the shutter member is closer to the second corner portion than the first corner portion.

42. A disc cartridge according to claim 41, wherein the set back portion of the case and the contact portion of the shutter member are substantially symmetrically arranged with respect to a center line passing through an axis of the disc and extending substantially perpendicular to the first edge surface of the case.

43. A disc cartridge according to claim 41, wherein a distance from the second edge surface to at least one part of the set back portion in an extension direction of the first edge surface is at least equal to a distance from the third edge surface to the contact portion of the shutter member in the first portion in the extension direction of the first edge surface.

44. A disc cartridge according to claim 43, wherein the distance of the at least one part of the set back portion from the second edge surface of the case is greater than the distance from the contact portion in the first position of the shutter member to the third edge surface of the case.

45. A disc cartridge according to claim 41, wherein the set back portion includes a first part and a second part spaced from the first part in an extension direction of the first edge surface, the first part being closer than the second part to the second edge surface, the first part and the second part extending in a direction transverse to the first edge surface of the case.

46. A disc cartridge according to claim 45, wherein a distance from the third edge surface to the second part of the set back portion in the extension direction of the first edge surface is less than a distance from the second edge surface to the contact portion in the first position of the shutter member in the extension direction of the first edge surface.

47. A disc cartridge according to claim 45, wherein a distance from the second edge surface to the second part of the set back portion in the extension direction of the first edge surface is greater than a distance from the third edge surface to the contact portion in the first position of the shutter member in the extension direction of the first edge surface.

48. A disc cartridge according to claim 40, wherein the shutter member slides in a straight path over the first edge surface.

49. A disc cartridge according to claim 40, wherein the set back portion is exposed at the first edge surface in the first position of the shutter member wherein the window is closed.

50. A disc cartridge comprising:

a case having a substantially square shape with first, second, third and fourth surfaces, the case having a disc therein and having a window for exposing at least a portion of the disc within the case, the first edge surface of the case being delimited by a first corner portion connecting the first edge surface and the second edge surface and a second corner portion connecting the first edge surface and the third edge surface;

a shutter member arranged for sliding movement in a straight path with respect to the case over the first edge surface from a first position where the window is closed by the shutter member to a second position where the window is opened by movement of the shutter member, the shutter member having a contact portion in the region of the second corner portion in the first position of the shutter member for being contacted to cause sliding movement of the shutter member toward the second position in a direction toward the first corner portion so that the contact portion in the second position of the shutter member is closer to the second corner portion than the first corner portion; and a spring for biasing the shutter member in a direction toward the first position wherein the window is closed, the spring being provided within the case in a region of the first corner portion;

the case having a recess formed by a set back portion set back from the first edge surface of the case in the region of the first corner portion of the case, a surface portion of the set back portion of the recess extending substantially parallel to the first edge surface and below the first edge surface, the shutter member being slidable over the first edge surface and the set back portion, the set back portion delimiting an opening extending through the case, the set back portion being exposed at the first edge surface of the case when the shutter member is in the first position wherein the window is closed, and the case having a chamfer portion extending between the first and second surfaces of the case.

51. A disc cartridge according to claim 50, wherein the set back portion includes a first part and a second part spaced from the first part in an extension direction of the first edge surface, the first part being closer than the second part to the second edge surface, the first part and the second part extending in a direction transverse to the first edge surface of the case.

52. A disc cartridge according to claim 51, wherein a distance from the third edge surface to the second part of the set back portion in the extension direction of the first edge surface is less than a distance from the second edge surface to the contact portion in the first position of the shutter member in the extension direction of the first edge surface.

53. A disc cartridge according to claim 52, wherein a distance from the second edge surface to the second part of the set back portion in the extension direction of the first edge surface is greater than a distance from the third edge surface to the contact portion in the first position of the shutter member in the extension direction of the first edge surface.

54. An optical disc cartridge comprising:

a case having a substantially square shape with first, second, third and fourth edge surfaces delimiting boundaries of the case, the case having an optical disc therein and having a window for exposing at least a portion of the optical disc within the case, the first edge surface of the case being delimited by a first corner portion connecting the first edge surface and the second edge surface and a second corner portion connecting the first edge and the third edge surface;

a shutter member arranged for sliding movement over the first edge surface from a first position where the window is closed by the shutter member to a second position where the window is opened by movement of the shutter member, the shutter member having a contact portion in the region of the second corner portion in the first position of the shutter member for being contacted to cause sliding movement of the shutter member toward the second position in a direction toward the first corner portion so that the contact portion in the second position of the shutter member is closer to the second corner portion than the first corner portion, the shutter member having a side portion opposite to the contact portion in the direction of shutter movement and arranged closer to the first corner portion than to the second corner portion, a first distance from the second edge surface to the side portion in the first position of the shutter member being at least two times larger than a second distance from the contact portion in the first position of the shutter member to the third edge surface; and biasing means for biasing the shutter member in a direction toward the first position wherein the window is closed;

the case having a recess formed by a set back portion set back from the first edge surface of the case in a region of the first corner portion of the case, a surface portion of the set back portion of the recess extending substantially parallel to the first edge surface and below the first edge surface, the shutter member being slidable over the first edge surface and the set back portion, the set back portion delimiting an opening extending through the case, the set back portion including a first part and a second part spaced from the first part in an extension direction of the first edge surface, the first part being closer than the second part to the second edge surface, the first part and the second part extending in a direction transverse to the first edge surface of the case, a distance from the second edge surface to the second part of the set back portion in the extension direction of the first edge surface being greater than a distance from the third edge surface to the contact portion in the first position of the shutter member in the extension direction of the first edge surface.

55. An optical disc cartridge according to claim 54, wherein the biasing means includes a spring biasing the shutter member and being disposed within the case in the region of the first corner portion of the case, the spring being a twisted coil spring extending from the first corner portion to a portion of the shutter member.

56. An optical disc cartridge according to claim 55, wherein the case has a side opening at a side of the first edge surface in the region of the first corner portion, the side opening extending into the region of the first corner portion in the case and extending across the set back portion.

57. An optical disc cartridge according to claim 56, wherein the case further includes a chamfer portion extending between the first and second edge surfaces of the case, the twisted coil spring having two ends, one of the two ends being associated with an associating portion, the associating portion extending from the set back portion and being disposed proximate to the chamfer portion in the case.

58. An optical disc cartridge according to claim 57, wherein the case has the chamfer portion in the region of the first corner portion of the case, and wherein the window of the optical disc cartridge is an aperture, the optical disc cartridge having a width equal to the width of a 3.5" flexible disk cartridge prescribed in the ANSI standard for a magnetic disc which is a disc cartridge incompatible with the optical disc cartridge, and a thickness greater than the thickness of the 3.5" flexible disk cartridge prescribed in the ANSI standard, the optical disc cartridge having the first edge surface as a front edge surface of the optical disc cartridge and the second edge surface orthogonal to the first edge surface, the second edge surface being a first side edge surface of the optical disc cartridge, the first edge surface and the second edge surface intersecting in the region of the first corner portion of the optical disc cartridge, wherein the 3.5" flexible disk cartridge as prescribed in the ANSI standard has a first edge surface as a front edge surface over which a shutter member slides to open or close an aperture provided to expose the floppy disc in the 3.5" flexible disk cartridge and a second edge surface as a side edge surface orthogonal to the first edge surface, the 3.5" flexible disk cartridge having a chamfer portion provided at the intersection of the first edge surface and the second edge surface of the 3.5" flexible disk cartridge in a direction that the shutter member at the front edge surface thereof moves to close the aperture when a bottom side of the 3.5" flexible disk cartridge has a location hole for prescribing dimensions of parts of the 3.5" flexible disk cartridge, the optical disc cartridge being provided with the chamfer portion in the direction in which the shutter member thereof moves to open the aperture of the optical disc cartridge, and when viewing the optical disc cartridge from the same side as viewing the 3.5" flexible disk cartridge, the chamfer portion of the optical disc cartridge is provided at a side of the optical disc cartridge which is opposite to a side of the 3.5" flexible disk cartridge where the chamfer portion of the 3.5" flexible disk cartridge is provided.

59. An optical disc cartridge according to claim 57, wherein the case has a top side and a bottom side delimited by the first, second, third and fourth edge surfaces, the bottom side has a location hole for prescribing dimensions of parts of the optical disc cartridge so that when viewing the top side from the fourth edge surface toward the first edge surface, the second edge surface is on a left side and the third edge surface is on a right side, the chamfer portion being provided in the region of the first corner portion at the left side of the case which is an opposite side with respect to the ANSI standard for a 3.5" flexible disk cartridge.

60. An optical disc cartridge according to claim 54, wherein the case further includes a chamfer portion extending between the first and second edge surfaces of the case.

61. An optical disc cartridge according to claim 60, wherein the case has the chamfer portion in the region of the first corner portion of the case, and wherein the window of the optical disc cartridge is an aperture, the optical disc cartridge having a width equal to the width of a 3.5" flexible disk cartridge prescribed in the ANSI standard for a magnetic disc which is a disc cartridge incompatible with the optical disc cartridge, and a thickness greater than the thickness of the 3.5" flexible disk cartridge prescribed in the ANSI standard, the optical disc cartridge having the first edge surface as a front edge surface of the optical disc cartridge and the second edge surface orthogonal to the first edge surface, the second edge surface being a first side edge surface of the optical disc cartridge, the first edge surface and the second edge surface intersecting in the region of the first corner portion of the optical disc cartridge, wherein the 3.5" flexible disk cartridge as prescribed in the ANSI standard has a first edge surface as a front edge surface over which a shutter member slides to open or close an aperture provided to expose the floppy disc in the 3.5" flexible disk cartridge and a second edge surface as a side edge surface orthogonal to the first edge surface, the 3.5" flexible disk cartridge having a chamfer portion provided at the intersection of the first edge surface and the second edge surface of the 3.5" flexible disk cartridge in a direction that the shutter member at the front edge thereof moves to close the aperture when a bottom side of the 3.5" flexible disk cartridge has a location hole for prescribing dimensions of parts of the 3.5" flexible disk cartridge, the optical disc cartridge being provided with the chamfer portion in the direction in which the shutter member thereof moves to open the aperture of the optical disc cartridge, and when viewing the optical disk cartridge from the same side as viewing the 3.5" flexible disk cartridge, the chamfer portion of the optical disc cartridge is provided at a side of the optical disc cartridge which is opposite to a side of the 3.5" flexible disk cartridge where the chamfer portion of the 3.5" flexible disk cartridge is provided.

62. An optical disc cartridge according to claim 60, wherein the case has a top side and a bottom side delimited by the first, second, third and fourth edge surfaces, the bottom side has a location hole for prescribing dimensions of parts of the optical disc cartridge so that when viewing the top side from the fourth edge surface toward the first edge surface, the second edge surface is on a left side and the third edge surface is on a right side, the chamfer portion being provided in the region of the first corner portion at the left side of the case which is an opposite side with respect to the ANSI standard for a 3.5" flexible disk cartridge.

63. An optical disc cartridge comprising:
a case having a substantially square shape with first, second, third and fourth edges, the case having an optical disc therein and having a window for exposing at least a portion of the optical disc within the case, the first edge of the case being delimited by a first corner portion connecting the first edge and the second edge and a second corner portion connecting the first edge and the third edge, the first edge including a recessed portion extending at least partly between the first and second corner portions;
a shutter member arranged for sliding movement over the recessed portion of the first edge from a first position where the window is closed by the shutter member to a second position where the window is opened by movement of the shutter member, the shutter member having a contact portion in the region of the second corner portion in the first position of the shutter member for being contacted to cause sliding movement of the shutter member toward the second position in a direction toward the first corner portion so that the contact portion in the second position of the shutter member is closer to the second corner portion than the first corner portion; and
biasing means for biasing the shutter member in a direction toward the first position wherein the window is closed;
the case having a set back portion set back from the recessed portion of the first edge of the case in a region of the first corner portion of the case, the set back portion delimiting an opening extending through the case.

64. An optical disc cartridge according to claim 63, wherein the set back portion includes a part thereof extending substantially parallel to the first edge and below the first edge and the recessed portion thereof.

65. An optical disc cartridge according to claim 63, wherein the set back portion includes a first part and a second part spaced from the first part in an extension direction of the first edge, the first part being closer than the second part to the second edge, the first part and the second part extending in a direction transverse to the first edge of the case, a distance from the second edge to the second part of the set back portion in the extension direction of the first edge being greater than a distance from the third edge to the contact portion in the first position of the shutter member in the extension direction of the first edge.

66. An optical disc cartridge according to claim 63, wherein the shutter member has a side portion opposite to the contact portion in the direction of shutter movement and arranged closer to the first corner portion than to the second corner portion, a first distance from the second edge to the side portion in the first position of the shutter member being at least two times larger than a second distance from the contact portion in the first position of the shutter member to the third edge.

67. An optical disc cartridge according to claim 63, wherein at least the set back portion enables prevention of upside-down insertion of the cartridge into an apparatus.

68. An optical disc cartridge according to claim 67, wherein the set back portion enables capturing and blocking of a shutter opening member of the apparatus to prevent upside-down insertion of the cartridge into the apparatus.

69. An optical disc cartridge according to claim 63, wherein the case further includes a chamfer portion extending between the first and second edges of the case.

70. An optical disc cartridge according to claim 69, wherein the case has the chamfer portion in the region of the first corner portion of the case, and wherein the window of the optical disc cartridge is an aperture, the optical disc cartridge having a width equal to the width of a 3.5" flexible disk cartridge prescribed in the ANSI standard for a magnetic disc which is a disc cartridge incompatible with the optical disc cartridge, and a thickness greater than the thickness of the 3.5" flexible disk cartridge prescribed in the ANSI standard, the optical disc cartridge having the first edge as a front edge of the optical disc cartridge and the second edge orthogonal to the first edge, the second edge being a first side edge of the optical disc cartridge, the first edge and the second edge intersecting in the region of the first corner portion of the optical disc cartridge, wherein the 3.5" flexible disk cartridge as prescribed in the ANSI standard has a first edge as a front edge over which a shutter member slides to open or close an aperture provided to expose the floppy disc in the 3.5" flexible disk cartridge and a second edge as a side edge orthogonal to the first edge, the 3.5" flexible disk cartridge having a chamfer portion provided at the intersection of the first edge and the second edge of the 3.5" flexible disk cartridge in a direction that the shutter member at the front edge thereof moves to close the aperture when a bottom side of the 3.5" flexible disk cartridge has a location hole for prescribing dimensions of parts of the 3.5" flexible disk cartridge, the optical disc cartridge being provided with the chamfer portion in the direction in which the shutter member thereof moves to open the aperture of the optical disc cartridge, and when viewing the optical disk cartridge from the same side as viewing the 3.5" flexible disk cartridge, the chamfer portion of the optical disc cartridge is provided at a side of the optical disc cartridge which is opposite to a side of the 3.5" flexible disk cartridge where the chamfer portion of the 3.5" flexible disk cartridge is provided.

71. An optical disc cartridge according to claim 69, wherein the case has a top side and a bottom side delimited by the first, second, third and fourth edges, the bottom side has a location hole for prescribing dimensions of parts of the optical disc cartridge so that when viewing the top side from the fourth edge toward the first edge, the second edge is on a left side and the third edge is on a right side, the chamfer portion being provided in the region of the first corner portion at the left side of the case which is an opposite side with respect to the ANSI standard for a 3.5" flexible disk cartridge.

72. An optical disc cartridge according to claim 69, wherein at least one of the set back portion and the chamfer portion enables prevention of improper insertion of a cartridge into an apparatus.

73. An optical disc cartridge according to claim 69, wherein at least one of the set back portion and the chamfer portion enables discrimination of proper and improper insertion of a cartridge into an apparatus.

74. An optical disc cartridge according to claim 63, wherein the biasing means includes a spring biasing the shutter member and being disposed within the case in the region of the first corner portion of the case.

75. An optical disc cartridge according to claim 74, wherein the spring is a twisted coil spring extending from the first corner portion to a portion of the shutter member.

76. An optical disc cartridge according to claim 75, wherein the case has a side opening at a side of the first edge in the region of the first corner portion, the side opening extending into the region of the first corner portion in the case and extending across the set back portion.

77. An optical disc cartridge according to claim 76, wherein the case further includes a chamfer portion extending between the first and second edges of the case, the twisted coil spring having two ends, one of the two ends being associated with an associating portion, the associating portion extending from the set back portion and being disposed proximate to the chamfer portion in the case.

78. An optical disc cartridge according to claim 63, wherein the case has a side opening at a side of the first edge in the region of the first corner portion, the side opening extending into the region of the first corner portion in the case and extending across the set back portion.

79. An optical disc cartridge comprising:

a case having a substantially square shape with first, second, third and fourth edges, the case having an optical disc therein and having a window for exposing at least a portion of the optical disc within the case, the first edge of the case being delimited by a first corner portion connecting the first edge and the second edge and a second corner portion connecting the first edge and the third edge, the first edge including a recessed portion extending at least partly between the first and second corner portions;

a shutter member arranged for sliding movement over the recessed portion of the first edge from a first position where the window is closed by the shutter member to a second position where the window is opened by movement of the shutter member, the shutter member having a contact portion in the region of the second corner portion in the first position of the shutter member for being contacted to cause sliding movement of the shutter member toward the second position in a direction toward the first corner portion so that the contact portion in the second position of the shutter member is closer to the second corner portion than the first corner portion, the shutter member has a side portion opposite to the contact portion in the direction of shutter movement and arranged closer to the first corner portion than to the second corner portion, a first distance from the second edge to the side portion in the first position of the shutter member being at least two times larger than a second distance from the contact portion in the first position of the shutter member to the third edge; and biasing means for biasing the shutter member in a direction toward the first position wherein the window is closed; and the case having a set back portion set back from the recessed portion of the first edge of the case in a region of the first corner portion of the case, the set back portion delimiting an opening extending through the case and including a first part and a second part spaced from the first part in an extension direction of the first edge, the first part being closer than the second part to the second edge, the first part and the second part extending in a direction transverse to the first edge of the case, a distance from the second edge to the second part of the set back portion in the extension direction of the first edge being greater than a distance from the third edge to the contact portion in the first position of the shutter member in the extension direction of the first edge.

80. An optical disc cartridge according to claim 79, wherein the biasing means includes a spring biasing the shutter member and being disposed within the case in the region of the first corner portion of the case, the spring being a twisted coil spring extending from the first corner portion to a portion of the shutter member.

81. An optical disc cartridge according to claim 80, wherein the case has a side opening at a side of the first edge in the region of the first corner portion, the side opening extending into the region of the first corner portion in the case and extending across the set back portion.

82. An optical disc cartridge according to claim 81, wherein the case further includes a chamfer portion extending between the first and second edges of the case, the twisted coil spring having two ends, one of the two ends being associated with an associating portion, the associating portion extending from the set back portion and being disposed proximate to the chamfer portion in the case.

83. An optical disc cartridge according to claim 82, wherein the case has the chamfer portion in the region of the first corner portion of the case, and wherein the window of the optical disc cartridge is an aperture, the optical disc cartridge having a width equal to the width of a 3.5" flexible disk cartridge prescribed in the ANSI standard for a magnetic disc which is a disc cartridge incompatible with the optical disc cartridge, and a thickness greater than the thickness of the 3.5" flexible disk cartridge prescribed in the ANSI standard, the optical disc cartridge having the first edge as a front edge of the optical disc cartridge and the second edge orthogonal to the first edge, the second edge being a first side edge of the optical disc cartridge, the first edge and the second edge intersecting in the region of the first corner portion of the optical disc cartridge, wherein the 3.5" flexible disk cartridge as prescribed in the ANSI standard has a first edge as a front edge over which a shutter member slides to open or close an aperture provided to expose the floppy disc in the 3.5" flexible disk cartridge and a second edge as a side edge orthogonal to the first edge, the 3.5" flexible disk cartridge having a chamfer portion provided at the intersection of the first edge and the second edge of the 3.5" flexible disk cartridge in a direction that the shutter member at the front edge thereof moves to close the aperture when a bottom side of the 3.5" flexible disk cartridge has a location hole for prescribing dimensions of parts of the 3.5" flexible disk cartridge, the optical disc cartridge being provided with the chamfer portion in the direction in which the shutter member thereof moves to open the aperture of the optical disc cartridge, and when viewing the optical disk cartridge from the same side as viewing the 3.5" flexible disk cartridge, the chamfer portion of the optical disc cartridge is provided at a side of the optical disc cartridge which is opposite to a side of the 3.5" flexible disk cartridge where the chamfer portion of the 3.5" flexible disk cartridge is provided.

84. An optical disc cartridge according to claim 82, wherein the case has a top side and a bottom side delimited by the first, second, third and fourth edges, the bottom side has a location hole for prescribing dimensions of parts of the optical disc cartridge so that when viewing the top side from the fourth edge toward the first edge, the second edge is on a left side and the third edge is on a right side, the chamfer portion being provided in the region of the first corner portion at the left side of the case which is an opposite side with respect to the ANSI standard for a 3.5" flexible disk cartridge.

85. An optical disc cartridge according to claim 79, wherein the case further includes a chamfer portion extending between the first and second edges of the case.

86. An optical disc cartridge according to claim 85, wherein the case has the chamfer portion in the region of the first corner portion of the case, and wherein the window of the optical disc cartridge is an aperture, the optical disc cartridge having a width equal to the width of a 3.5" flexible disk cartridge prescribed in the ANSI standard for a magnetic disc which is a disc cartridge incompatible with the optical disc cartridge, and a thickness greater than the thickness of the 3.5" flexible disk cartridge prescribed in the ANSI standard, the optical disc cartridge having the first edge as a front edge of the optical disc cartridge and the second edge orthogonal to the first edge, the second edge being a first side edge of the optical disc cartridge, the first edge and the second edge intersecting in the region of the first corner portion of the optical disc cartridge, wherein the 3.5" flexible disk cartridge as prescribed in the ANSI standard has a first edge as a front edge over which a shutter member slides to open or close an aperture provided to expose the floppy disc in the 3.5" flexible disk cartridge and a second edge as a side edge orthogonal to the first edge, the 3.5" flexible disk cartridge having a chamfer portion provided at the intersection of the first edge and the second edge of the 3.5" flexible disk cartridge in a direction that the shutter member at the front edge thereof moves to close the aperture when a bottom side of the 3.5" flexible disk cartridge has a location hole for prescribing dimensions of parts of the 3.5" flexible disk cartridge, the optical disc cartridge being provided with the chamfer portion in the direction in which the shutter member thereof moves to open the aperture of the optical disc cartridge, and when viewing the optical disk cartridge from the same side as viewing the 3.5" flexible disk cartridge, the chamfer portion of the optical disc cartridge is provided at a side of the optical disc cartridge which is opposite to a side of the 3.5" flexible disk cartridge where the chamfer portion of the 3.5" flexible disk cartridge is provided.

87. An optical disc cartridge according to claim 85, wherein the case has a top side and a bottom side delimited by the first, second, third and fourth edges, the bottom side has a location hole for prescribing dimensions of parts of the optical disc cartridge so that when viewing the top side from the fourth edge toward the first edge, the second edge is on a left side and the third edge is on a right side, the chamfer portion being provided in the region of the first corner portion at the left side of the case which is an opposite side with respect to the ANSI standard for a 3.5" disk cartridge.

* * * * *